US009879740B2

United States Patent
Tironi et al.

(10) Patent No.: US 9,879,740 B2
(45) Date of Patent: Jan. 30, 2018

(54) METHOD FOR MAKING A BRAKE DISC, BRAKE DISC FOR DISC BRAKE AND A DISC BRAKE

(71) Applicant: FRENI BREMBO S.P.A., Curno (IT)

(72) Inventors: Giovanni Mario Tironi, Curno (IT); Fabiano Carminati, Curno (IT); Lorenzo Cavalli, Curno (IT); Laura Sammarelli, Curno (IT)

(73) Assignee: Freni Brembo S.p.A., Curno, Bergamo (IT)

( * ) Notice: Subject to any disclaimer, the term of this patent is extended or adjusted under 35 U.S.C. 154(b) by 0 days.

(21) Appl. No.: 14/392,052

(22) PCT Filed: Dec. 18, 2013

(86) PCT No.: PCT/IB2013/061104
§ 371 (c)(1),
(2) Date: Jun. 18, 2015

(87) PCT Pub. No.: WO2014/097186
PCT Pub. Date: Jun. 26, 2014

(65) Prior Publication Data
US 2015/0354647 A1 Dec. 10, 2015

(30) Foreign Application Priority Data

Dec. 21, 2012 (IT) .............................. PD2012A0403
Dec. 21, 2012 (IT) .............................. PD2012A0404

(51) Int. Cl.
*F16D 65/12* (2006.01)
*C23C 24/04* (2006.01)
(Continued)

(52) U.S. Cl.
CPC .............. *F16D 65/127* (2013.01); *C23C 4/10* (2013.01); *C23C 24/04* (2013.01); *F16D 65/12* (2013.01);
(Continued)

(58) Field of Classification Search
CPC ...... F16D 65/12; F16D 65/125; F16D 65/127; F16D 69/02; F16D 69/003; F16D 69/027;
(Continued)

(56) References Cited

U.S. PATENT DOCUMENTS 4,402,992 A * 9/1983 Liebert .................... C23C 4/02
427/243
4,715,486 A 12/1987 Burgdorf et al.
(Continued)

FOREIGN PATENT DOCUMENTS

DE          4321713 A1    1/1994
DE     102008062132 A1    6/2010
(Continued)

OTHER PUBLICATIONS

English Machined translation of JP-2007-113642, Publication— May, 10, 2007.*
(Continued)

*Primary Examiner* — Robert A Siconolfi
*Assistant Examiner* — San Aung
(74) *Attorney, Agent, or Firm* — Marshall & Melhorn, LLC

(57) ABSTRACT

The present invention relates to a method for making a brake disc comprising the following operating steps: a) providing a brake disc, comprising a braking band 2 made of aluminum or aluminum alloy and provided with two opposite braking surfaces 2a, 2b, each of which at least partially defines one of the two main sides of the disc; b) depositing a material in particle form on the disc with HVOF (High
(Continued)

Velocity Oxygen Fuel) technique or with HVAF (High Velocity Air Fuel) technique or with KM (Kinetic Metallization) technique, forming a protective coating 3 which covers at least one of the two braking surfaces of the braking band. The material in particle form is composed of 80 to 90% by weight of tungsten carbide, 8% to 12% by weight of cobalt and 2% to 6% by weight of chromium.

1 Claim, 6 Drawing Sheets

(51) Int. Cl.
C23C 4/10 (2016.01)
F16D 69/00 (2006.01)
(52) U.S. Cl.
CPC ...... *F16D 65/125* (2013.01); *F16D 2069/003* (2013.01); *F16D 2250/0046* (2013.01)
(58) Field of Classification Search
CPC ....... F16D 2200/003; F16D 2200/0039; F16D 2250/0038; F16D 2250/0046; C23C 4/10; C23C 4/11; C23C 4/06; C23C 24/04; C23C 4/12; C23C 4/129; C23C 28/027
USPC .......... 188/218 XL; 427/451, 191, 203, 205, 427/470, 455, 456, 427, 27.3, 427.4, 427/419.7, 450
See application file for complete search history.

(56) References Cited

U.S. PATENT DOCUMENTS

| 5,407,035 | A | 4/1995 | Cole et al. |
|---|---|---|---|
| 5,499,672 | A | 3/1996 | Nakashima et al. |
| 8,657,082 | B2 | 2/2014 | Lembach et al. |
| 2002/0168466 | A1* | 11/2002 | Tapphorn ............... B22C 1/14 427/134 |
| 2004/0115477 | A1* | 6/2004 | Nesbitt ............... A47J 36/025 428/692.1 |
| 2006/0151268 | A1 | 7/2006 | Kesavan et al. |
| 2008/0131621 | A1* | 6/2008 | Lineton ............... C23C 10/04 427/556 |
| 2008/0196986 | A1* | 8/2008 | Meckel ............... C23C 14/022 188/218 XL |
| 2009/0026025 | A1* | 1/2009 | Hampton ............... F16D 65/127 188/218 XL |
| 2009/0317642 | A1* | 12/2009 | Goller ............... C04B 35/565 428/450 |
| 2011/0278116 | A1* | 11/2011 | Lembach ............... F16D 65/12 188/218 XL |
| 2011/0293849 | A1* | 12/2011 | Lembach ............... F16D 65/127 427/535 |
| 2014/0234609 | A1* | 8/2014 | Reisel ............... C22C 29/08 428/312.8 |

FOREIGN PATENT DOCUMENTS

| DE | 102009008105 A1 | 8/2010 |
|---|---|---|
| JP | 2007-113642 A | 5/2007 |
| WO | 2010/103369 A1 | 9/2010 |
| WO | 2012/168139 A1 | 12/2012 |

OTHER PUBLICATIONS

European Patent Office, International Search Report and the Written Opinion of the International Searching Authority; International Application No. PCT/IB2013/061104; dated Feb. 18, 2014, European Patent Office, Rijswijk, Netherlands.
The Hague; Reinhold Becker; Search Report for IT PD20120403, dated Nov. 6, 2013; Netherlands.
The Hague; Reinhold Becker; Search Report for IT PD20120404, dated Nov. 12, 2013; Netherlands.

* cited by examiner

METHOD FOR MAKING A BRAKE DISC, BRAKE DISC FOR DISC BRAKE AND A DISC BRAKE

FIELD OF APPLICATION

The present invention relates to a method for making a brake disc, a brake disc for disc brakes and a disc brake.

BACKGROUND ART

A brake disc of a disc braking system of a vehicle comprises an annular structure, or braking band, and a central attachment element, known as bell, by which the disc is attached to the rotating part of a suspension of a vehicle, such as a hub. The braking band is provided with opposite braking surfaces suitable for cooperating with friction elements (brake pads), housed in at least one caliper body arranged astride of such a braking band and integral with a non-rotating component of the vehicle suspension. The controlled interaction between the opposite brake pads and the opposed braking surfaces of the braking band by friction determine a braking action which allows the deceleration or stop of the vehicle.

In general, the brake disc is made of grey cast iron. This material allows, in fact, good braking performance to be obtained (especially in terms of containment of wear) at relatively low cost. Discs made of carbon or carbon-ceramic materials offer much better performance, but at much higher costs.

A limit not yet overcome of cast iron discs is related to the excessive weight of the disc.

Attempts have been made at overcoming this problem by making aluminium discs, with protective coatings. The protective coating is used on the one hand to reduce the disc wear and thus ensure performances similar to the cast iron discs, and on the other hand to protect the aluminium base from temperatures that are generated in braking, well above the softening temperatures of aluminium (200-400° C.).

Protective coatings currently available and applied on aluminium discs, while offering resistance to wear, however, are subject to flaking that cause the detachment thereof from the aluminium disc itself.

A protective coating of this type is described for example in U.S. Pat. No. 4,715,486, related to a low wear disc brake. The disc, made in particular of cast iron, has a coating made of a material in particle form deposited on the disc with a high kinetic energy impact technique. According to a first embodiment, the coating contains from 20% to 30% of tungsten carbide, 5% of nickel and the remaining part of a mixture of chromium carbide and tungsten. According to a second embodiment, the coating contains from 80% to 90% of tungsten carbide, up to 10% of cobalt, up to 5% of chromium and up to 5% of carbon.

It has been found that one of the main causes of the detachment of traditional protective coatings from aluminium or aluminium alloy discs is the presence of nickel in the protective coating.

In case of application of the coating with flame spray techniques, a second cause of the detachment of traditional protective coatings from aluminium or aluminium alloy discs is the presence of free carbon in the protective coating. The carbon tends, in fact, to burn, combining with the oxygen incorporated in the protective coating being formed. This leads to the formation of micro-bubbles within the coating, which may prevent an adequate adhesion of the coating on the disc, favouring the detachment thereof.

From the foregoing it is clear that the coated discs made of aluminium or aluminium alloy cannot be currently used in the field of braking systems.

In consideration of the advantages arising from the use of aluminium to reduce the weight of brake discs, however, the need to solve the problems mentioned with reference to the prior art is very much felt in the field. In particular, the need of having aluminium discs with protective coatings that are able to increase the wear resistance of the disc and are at the same time resistant is felt.

One of the main problems of disc brakes is to extend the life of the braking surfaces and of the brake pads.

As known, in fact, in the braking surfaces, tracks or other surface irregularities are quickly created, for example due to the dirt or to the same friction material of the pads pulverised during the braking, which interpose between the braking surface and the pad during the braking action. These surface irregularities cause an irritating noise or rattle and a considerable increase of the wear of the disc and of the pad itself. In the practice, these drawbacks limit the braking disc life both for an inadequate service comfort and for excessive component wear.

The above wear problems are particularly accentuated in discs made with traditional materials, such as grey cast iron and aluminium or aluminium alloys, compared with discs made of carbon-ceramic materials.

The need to reduce the wear of the brake disc, in particular if made of aluminium or grey cast iron, and of the pads, therefore is particularly felt, so as to mitigate the above drawbacks.

On the brake disc side, the problem has been addressed by proposing brake discs coated with protective materials, designed to improve the wear resistance. In particular, a type of protective coating involves the use of a mixture of ceramic powders and binding metal materials.

On the brake pad side, the problem has been addressed in many ways, by proposing and testing different types of friction materials.

One type of friction material which is very widespread consists of materials obtained by hot moulding composed of fibres, abrasive materials, lubricants, metal materials and polymerizable binders (for example, phenolic resin).

An example of friction material is described in US20060151268. The friction material includes iron, aluminium, zinc and tin fibres. Iron fibres are present with an amount by volume of between about 1% and about 10%. Aluminium, zinc and tin fibres are present with an amount by volume of between about 1% and about 5%. The friction material is free from elemental copper, so as to prevent the release thereof to the environment during use. In particular, the friction material comprises about 11% by volume of graphite and/or coke, or about 6% by volume of graphite only. The material also comprises about 3% by volume of alumina, or about 5% by volume of zirconium oxide.

As is known, in order to obtain braking systems with good tribological performance and with high resistance to wear of the components, it is necessary to calibrate the brake disc features with those of the pad and vice versa. Often, in fact, components (discs and pads) that taken individually exhibit excellent performance (for example in terms of wear resistance), then give mediocre results, if not bad, when used in combination.

The need to identify disc brakes that provide good tribological performance and exalt the performance of the individual components subject to wear and tear (i.e. discs and pads) is therefore particularly felt.

DISCLOSURE OF THE INVENTION

The need for aluminium discs provided with protective coatings that are able to increase the wear resistance of the disc and are at the same time resistant over time is met by a method for making a brake disc according to claim 1 and by a brake disc for disc brakes according to claim 12.

In particular, such a need is met by a method for making a brake disc made of aluminium with a protective coating comprising the following operating steps:

a) providing a brake disc, comprising a braking band made in aluminium or aluminium alloy and provided with two opposite braking surfaces, each of which defines at least partially one of the two main sides of the disc;

b) depositing a material in particle form on the disc using HVOF ("High Velocity Oxygen Fuel") technique or HVAF (High Velocity Air Fuel) technique or KM (Kinetic Metallization) technique, to form a protective coating that covers at least one of the two braking surfaces of the braking band.

The material in particle form is composed of 80 to 90% by weight of tungsten carbide, 8% to 12% by weight of cobalt and 2% to 6% by weight of chromium.

According to a preferred embodiment of the method, the material in particle form is composed of 86% by weight of tungsten carbide, 10% by weight of cobalt and 4% by weight of chromium.

Preferably, the particle size of the particles of the material in particle form is comprised between 5 and 40 μm.

According to a possible embodiment of the method, the protective coating has a thickness between 20 μm and 100 μm, and in particular between 20 μm and 80 μm.

According to a preferred embodiment of the method, the deposition step b) comprises two or more separate deposition passages of the material in particle form on the same surface to form the protective coating.

In particular, the deposition step b) comprises a first step of deposition of the material in particle form to create a base layer of the coating directly on the disc and a second step of deposition of the material in particle form to create a finishing layer on the base layer. The material in particle form deposited with the first deposition passage has a particle size greater than that deposited with the second deposition passage.

According to a particular embodiment of the method, the material in particle form deposited with the first deposition passage has a particle size between 30 and 40 μm. The material in particle form deposited with the second deposition step has a particle size comprised between 5 and 20 μm.

In particular, the protective coating has a surface roughness Ra of 2.0 to 3.0 μm at the finishing layer.

In particular, the base layer of the coating has a thickness between 2/4 and 3/4 of the total thickness of the coating. The finishing layer has a thickness between 1/4 and 2/4 of the total thickness of the coating.

According to a possible embodiment of the method, the entire disc is made of aluminium or aluminium alloy.

According to a possible embodiment of the method, the protective coating covers the entire surface of the disc.

According to a particular embodiment of the method, in the deposition step b) the material in particle form is deposited in a differentiated manner on the surface of the disc at least in terms of thickness of the coating.

In particular, each main side of the disc is defined at least by a first annular portion, corresponding to a braking surface of the braking band, and by a second annular portion, which is more inward than the first and which defines the attachment zone of the disc to a vehicle. In the deposition step b), a protective coating is made which covers at least both portions. The coating made on the first annular portion has a thickness greater than that of the coating made on the second portion.

In particular, the need mentioned above is met by a brake disc 1 for a disc brake, comprising a braking band 2, made in aluminium or aluminium alloy and provided with two opposite braking surfaces 2a and 2b, each of which defines at least partially one of the two main sides of the disc. Disc 1 is provided with a protective coating 3 which covers at least one of the two braking surfaces of the braking band. The coating is composed of 80 to 90% by weight of tungsten carbide, 8% to 12% by weight of cobalt and 2% to 6% by weight of chromium. The coating is obtained by depositing the components of the coating in particle form on the disc with HVOF technique, or HVAF (High Velocity Air Fuel) technique or KM (Kinetic Metallization) technique.

According to a preferred embodiment of the brake disc, coating 3 is composed of 86% by weight of tungsten carbide, 10% by weight of cobalt and 4% by weight of chromium.

Preferably, the coating is obtained by depositing on the disc said components in particle form with a particle size between 5 and 40 μm.

According to a particular embodiment of the brake disc, the protective coating has a thickness between 20 μm and 100 μm, and in particular between 20 μm and 80 μm.

According to a particular embodiment of the brake disc, the protective coating is composed of a base layer, which is directly associated to the disc and is made with a first deposition step of the material in particle form, and an upper finishing layer, which is arranged on the base layer and is made with a second deposition step of the material in particle form. The material in particle form deposited with the first deposition passage has a particle size greater than that deposited with the second deposition passage.

In particular, the material in particle form deposited in the first deposition passage has a particle size of 30 to 40 μm, while the material in particle form deposited in the second deposition passage has a particle size of 5 to 20 μm.

In particular, the protective coating has a surface roughness Ra of 2.0 to 3.0 μm at the finishing layer.

According to a possible embodiment of the brake disc, the base layer has a thickness between 2/4 and 3/4 of the total thickness of the coating, while the finishing layer has a thickness between 1/4 and 2/4 of the total thickness of the coating.

According to a possible embodiment of the brake disc, the entire disc is made of aluminium or aluminium alloy.

According to a possible embodiment of the brake disc, the protective coating covers the entire surface of the disc.

According to a preferred embodiment of the brake disc, the coating has different thicknesses in different areas of the disc surface.

In particular, each main side of the disc is defined at least by a first annular portion, corresponding to a braking surface of the braking band, and by a second annular portion, which is more inward than the first and which defines the attachment zone of the disc to the vehicle. The protective coating made on the first annular portion has a-thickness greater than that of the coating made on the second portion.

The need to identify disc brakes that provide good tribological performance and enhance the performance of the individual components subject to wear (i.e. discs and pads) is met by a disc brake according to claim 19.

In particular, such a need is met by a disc brake comprising:
- a brake disc, comprising a braking band provided with two opposite braking surfaces, each of which defines at least partially one of the two main sides of the disc;
- friction elements, suitable for being commanded to cooperate with said braking surfaces determining a braking action by friction.

The disc is provided with a protective coating which covers at least one of the two braking surfaces of the braking band. The coating is composed of 80 to 90% by weight of tungsten carbide, 8% to 12% by weight of cobalt and 2% to 6% by weight of chromium. The coating is obtained by depositing the components of the coating in particle form on the disc using plasma spray HVOF (High Velocity Oxygen Fuel) technique, or HVAF (High Velocity Air Fuel) technique or KM (Kinetic Metallization) technique.

Each friction element comprises a friction portion composed of 10% to 40% by weight of abrasive materials, 8% to 40% by weight of lubricants, 5 to 30% by weight of metal fibres, 6% to 18% by weight of an organic binding agent and 10% to 20% by weight of inorganic fillers, the balance being composed of organic fillers.

Preferably, the friction portion is composed of 25% to 30% by weight of abrasive materials, 25% to 35% by weight of lubricants, 15 to 20% by weight of metal fibres, 8% to 15% by weight of an organic binding agent and 10% to 20% by weight of inorganic fillers, the balance being composed of organic fillers.

The friction portion has a density of between 2 and 3 g/cm3. Preferably, the density is between 2.60 and 2.20 g/cm3.

The friction portion has a porosity not higher than 10%.

According to a preferred embodiment of the disc brake, coating 3 is composed of 86% by weight of tungsten carbide, 10% by weight of cobalt and 4% by weight of chromium.

Preferably, the coating is obtained by depositing on the disc said components in particle form with a particle size between 5 and 40 μm.

According to a particular embodiment of the disc brake, the protective coating has a thickness between 20 μm and 100 μm.

According to a particular embodiment of the disc brake, the protective coating is composed of a base layer, which is directly associated to the disc and is made with a first deposition step of the material in particle form, and an upper finishing layer, which is arranged on the base layer and is made with a second deposition step of the material in particle form. The material in particle form deposited with the first deposition passage has a particle size greater than that deposited with the second deposition passage. The first passage with larger particle size allows the adhesion of the protective coating to be improved, while the second passage with a finer particle size allows the porosity to be reduced.

In particular, the material in particle form deposited in the first deposition passage has a particle size of 30 to 40 μm, while the material in particle form deposited in the second deposition passage has a particle size of 5 to 20 μm.

In particular, the protective coating has a surface roughness Ra of 2.0 to 3.0 μm at the finishing layer.

According to a possible embodiment of the disc brake, the base layer has a thickness between 2/4 and 3/4 of the total thickness of the coating, while the finishing layer has a thickness between 1/4 and 2/4 of the total thickness of the coating.

According to a possible embodiment of the disc brake, the entire disc is made of aluminium or aluminium alloy.

According to a possible embodiment of the disc brake, the protective coating covers the entire surface of the disc.

According to a preferred embodiment of the disc brake, the coating has different thicknesses in different areas of the disc surface.

In particular, each main side of the disc is defined at least by a first annular portion, corresponding to a braking surface of the braking band, and by a second annular portion, which is more inward than the first and which defines the attachment zone of the disc to the vehicle. The protective coating made on the first annular portion has a thickness greater than that of the coating made on the second portion.

Advantageously, the friction portion of each friction element has a rupture modulus, measured with a three-point bending test, greater than 20 MPa.

Advantageously, the friction portion of each friction element has a elastic modulus, measured with a three-point bending test, greater than 8 GPa.

According to a preferred embodiment of the invention, the abrasive materials comprised in the friction portion are in the form of particles having a particle size not exceeding 60 μm.

In particular, the abrasive materials comprise particles of alumina and/or periclase.

According to a preferred embodiment of the invention, the lubricants are in the form of particles having a particle size between 350 μm and 750 μm.

In particular, the lubricants comprise graphite and/or coke.

According to a preferred embodiment of the invention, the metal fibres comprise copper and/or iron fibres.

Preferably, the organic binder is a phenolic resin.

In particular, the inorganic fillers comprise barite and/or vermiculite.

In particular, the organic fillers comprise rubber and/or aramid fibre.

Preferably, the friction portion of each friction element is obtained by moulding at pressures not less than 250 kg/cm2, and preferably not less than 550 kg/cm2.

Preferably, the friction portion of each friction element is subjected to a heat treatment of polymerization of the organic binder for a period of time not less than 5 minutes.

DESCRIPTION OF THE DRAWINGS

Further features and the advantages of the present invention will appear more clearly from the following description of preferred non-limiting embodiments thereof, in which.

Elements or parts of elements in common between the embodiments described below are referred to with the same reference numerals.

DETAILED DESCRIPTION

Figure 1:
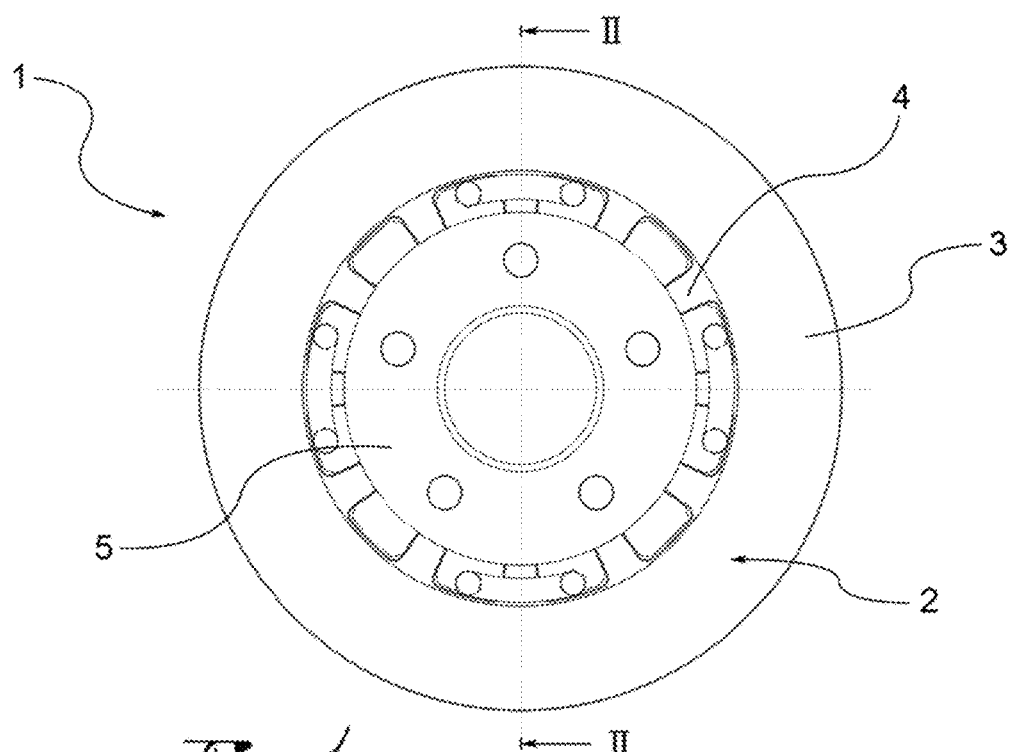
FIG. 1 shows a top plan view of a disc brake according to an embodiment of the present invention.

With reference to the above figures, reference numeral 1 globally denotes a brake disc according to the present invention.

According to a general embodiment of the invention, shown in the accompanying Figures, the brake disc 1 comprises a braking band 2, made in aluminium or aluminium alloy, provided with two opposite braking surfaces 2a and 2b, each of which defines at least partially one of the two main sides of the disc.

Disc 1 is provided with a protective coating which covers at least one of the two braking surfaces of the braking band.

The coating is composed of 80 to 90% by weight of tungsten carbide, 8% to 12% by weight of cobalt and 2% to 6% by weight of chromium.

The coating is obtained by depositing the components of the coating in particle form on the disc with HVOF technique, or HVAF (High Velocity Air Fuel) technique or KM (Kinetic Metallization) technique.

For the sake of simplicity, the brake disc 1 will now be described together with the method according to the present invention. The brake disc 1 is preferably, but not necessarily, made with the method according to the invention which will now be described.

According to a general embodiment of the method according to the invention, the method comprises the following operating steps:

a) providing a brake disc, comprising a braking band 2, made in aluminium or aluminium alloy and provided with two opposite braking surfaces 2a and 2b, each of which defines at least partially one of the two main sides of the disc;

b) depositing a material in particle form on the disc to form a protective coating 3 which covers at least one of the two braking surfaces of the braking band.

Advantageously, the brake disc is made with a portion adapted to the attachment of the disc to a vehicle, composed of an annular portion 4 arranged centrally to disc 1 and concentric to the braking band 2. The attachment portion 4 supports the element 5 of connection to the wheel hub (i.e. the bell). The bell may be made integrally with the annular attachment portion (as shown in the accompanying Figures) or it may be made separately and, then, through appropriate connecting elements attached to the attachment portion.

The annular attachment portion 4 may be made of aluminium or aluminium alloy, as the braking band, or another suitable material. Also bell 5 may be made of aluminium (or aluminium alloy) or another suitable material. In particular, all the disc (i.e. braking band, attachment portion and bell) may be made of aluminium or aluminium alloy.

Preferably, the braking band 2 is made by casting of aluminium or aluminium alloy. Likewise, when made of aluminium or aluminium alloy, the attachment portion and/or the bell may be made by casting.

The annular attachment portion may be made integral with the braking band (as shown in the accompanying Figures) or it may be made as a separate body, mechanically connected to the braking band.

Preferably, the deposition step b) is preceded by a step c) of preparation of the surface on which the protective coating must be made. In particular, the surface preparation step c) consists of cleaning the surface with solvent adapted to remove oil or dirt. Preferably, the preparation step c) may include abrasive actions on the disc surface, for example by sanding or smoothing.

According to an essential aspect of the invention, the material in particle form is deposited on the disc with HVOF technique or HVAF (High Velocity Air Fuel) technique or with KM (Kinetic Metallization) technique.

These are deposition techniques well known to a man skilled in the art and therefore shall not be described in detail.

HVOF is a powder spray deposition technique using a spray device provided with a mixing and combustion chamber and a spray nozzle. Oxygen and fuel are fed to the chamber. The hot combustion gas which is formed at pressures close to 1 MPA crosses the converging-diverging nozzle, the powder material reaching hypersonic speeds (i.e. higher than MACH 5). The powder material to be deposited is injected into the hot gas stream, where it quickly melts and is accelerated to speeds in the order of 1000 m/s. Once impacted on the deposition surface, the molten material cools rapidly and due to the high kinetic energy impact, it forms a very dense and compact structure.

The HVAF (High Velocity Air Fuel) deposition technique is similar to the HVOF technique. The difference is that in the HVAF technique air is fed to the combustion chamber instead of oxygen. The temperatures involved are therefore lower than those of the HVOF. This allows greater control of the thermal alteration of the coating.

The KM (Kinetic Metallization) deposition technique is a deposition process in the solid state in which metal powders are sprayed through a two-phase sonic deposition nozzle that accelerates and tribo-electrically charges the metal particles within a stream of inert gas. It is envisaged that thermal energy is supplied to the transport stream. In the process there is the transformation of potential energy of the compressed inert gas stream and of the thermal energy supplied in kinetic energy of the powders. Once accelerated at high speed and electrically charged, the particles are directed against the deposition surface. The high-speed collision of the metal particles with such a surface causes a large deformation of the particle (approximately 80% in the direction normal to the impact). This deformation results in a huge increase in the surface area of the particles. Upon the impact, therefore, there is the effect of intimate contact between the particles and the deposition surface, which leads to the formation of metallic bonds and a coating having a very dense and compact structure.

Advantageously, as an alternative to the three deposition techniques listed above, sharing the fact of being deposition techniques with a high kinetic energy impact, other techniques may also be used which use different deposition methods, but which are able to generate coatings having a very dense and compact structure.

According to a further essential aspect of the invention, the material in particle form is composed of 80 to 90% by weight of tungsten carbide (WC), 8% to 12% by weight of cobalt (Co) and 2% to 6% by weight of chromium (Cr).

The combination of the deposition technique HVOF, HVAF or KM and the chemical components used for forming the coating allows a protective coating to be obtained with a high bonding strength, which ensures a high degree of anchoring on the aluminium or aluminium alloy. The absence of nickel greatly reduces (as compared to the prior art solutions) the risk of detachment of the coating from the aluminium base or aluminium alloy.

Advantageously, the material in particle form does not contain nickel (Ni), preferably not even in the form of traces. In fact, it has been found that one of the main causes of the detachment of traditional protective coatings from aluminium or aluminium alloy discs is the presence of nickel in the protective coating.

Advantageously, the material in particle form does not contain free carbon (C), preferably not even in the form of traces. In fact, it has been found that in case of application of the coating with flame spray techniques, a second cause of the detachment of traditional protective coatings from aluminium or aluminium alloy discs is the presence of free carbon in the protective coating. The carbon tends, in fact, to burn, combining with the oxygen incorporated in the protective coating being formed. This leads to the formation of micro-bubbles within the coating, which may prevent an adequate adhesion of the coating on the disc, favouring the detachment thereof.

The coating has, in addition, a high wear resistance. Experimental tests carried out by comparing a brake disc according to the invention with a traditional disc made of grey cast iron have shown that the disc according to the invention has a duration substantially longer than traditional ones under equal test conditions. The weight of the aluminium disc, with the same dimensions, is about half of a disc in grey cast iron.

Preferably, the material in particle form is composed of 86% by weight of tungsten carbide, 10% by weight of cobalt and 4% by weight of chromium.

This particular composition allows the best results in terms of wear resistance and adhesion to aluminium.

Preferably, the particle size of the particles of the material in particle form is comprised between 5 and 40 μm. The choice of this range of values allows high density, hardness and limited porosity features to be imparted to the coating.

Figure 2:
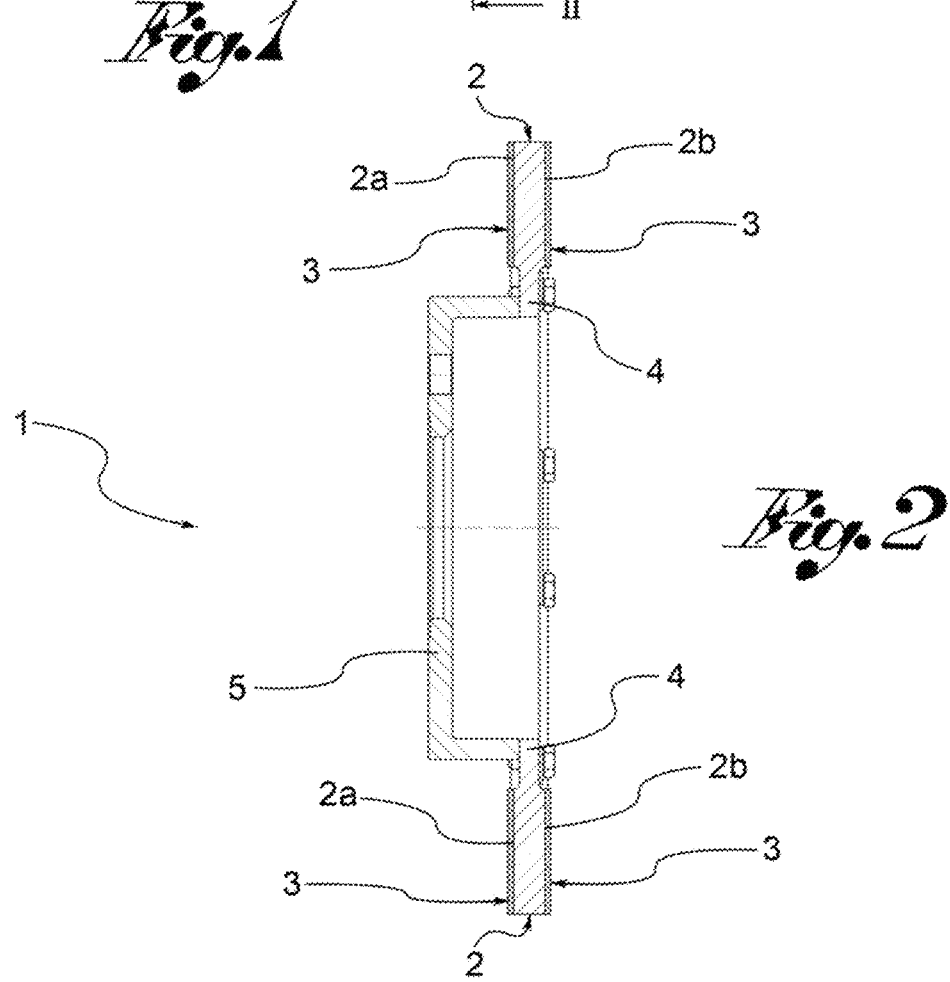
FIG. 2 shows a cutaway view of the disc in FIG. 1, along the section line II-II indicated therein.

The protective coating 3 covers at least one of the two braking surfaces of the braking band. Preferably, as shown in FIG. 2, disc 1 is provided with a protective coating 3 which covers both braking surfaces 2a and 2b of the braking band 2.

In particular, coating 3 can cover only the braking band, on a single braking surface, or on both.

According to embodiments not shown in the accompanying Figures, the protective coating 3 may also extend to other parts of disc 1 as the annular attachment portion 4 and bell 5, to cover the entire surface of disc 1. In particular, the coating may cover—in addition to the braking band—only the attachment portion or only the bell. The choice is essentially dictated by aesthetic reasons, to have uniformity of colour and/or finish on the entire disc or certain portions thereof.

Preferably, the protective coating has a thickness between 20 μm and 80 μm. The choice of this range of values allows a good compromise between the wear of the protective coating layer and the thermal expansion of the same. In other words: if the thickness of the protective coating was less than 20 μm, in the event of wear, the total removal thereof would occur. A thickness greater than 80 μm, on the other hand, can lead to imperfect adhesion due to thermal expansions that occur during the life cycle of a brake disc.

Advantageously, the deposition of the material in particle form for forming the coating can be carried out in a differentiated manner on the disc surface at least in terms of thickness of the coating.

Preferably, the protective coating made on the braking band has a thickness greater than that made on other portions of the disc. The coating at portions different from those of the braking band may have a thickness between 20 and 80 μm.

At the braking band, the protective coating may be made with the same thickness in the two opposite braking surfaces. Alternative solutions may be provided where the coating is made by differentiating the different thicknesses between the two braking surfaces of the braking band.

According to a particularly preferred embodiment of the method, the deposition step b) comprises two or more separate deposition passages of the material in particle form on the same surface to form the protective coating.

More in detail, the above deposition step b) comprises:
 a first step of deposition of the material in particle form to create a base layer of the coating directly on the disc; and
 a second step of deposition of the material in particle form to create a finishing layer on the base layer.

Dividing the deposition step into two or more passages in particular allows a differentiation at least of the particle size of the material in particle form used in the different passages. This makes the deposition step more flexible.

Advantageously, the material in particle form deposited with the first deposition passage has a particle size greater than that deposited with the second deposition passage. In particular, the material in particle form deposited in the first deposition passage has a particle size of 30 to 40 μm, while the material in particle form deposited in the second deposition passage has a particle size of 5 to 20 μm.

Making the coating in two separate deposition passages, using a coarser particle size for forming the base layer and a finer particle size for forming the finishing layer, allows a coating to be obtained which already at the end of the deposition has the desired surface finish features, without the need to adjust and/or perform other surface finishing operations for the coating. The particles deposited with the second passage fill the coarse surface roughness of the base layer. Advantageously, the level of surface finish of the coating may be adjusted by adjusting the particle size of the particles deposited with the second passage.

In particular, using for the first passage particles with a particle size of 30 and 40 μm and for the second passage particles with a particle size of 5 and 20 μm, the protective coating has a surface roughness Ra between 2.0 and 3.0 μm at the finishing layer.

Overall, the combination of the deposition technique HVOF, HVAF or KM of the material in particle form, the chemical components used and the deposition in multiple steps allows a coating to be obtained having a limited level of surface roughness, particularly suitable for the purposes of use of the brake disc 1.

Preferably, the base layer has a thickness between 2/3 and 3/4 of the total thickness of the coating, while the finishing layer has a thickness between 1/4 and 2/3 of the total thickness of the coating.

As can be understood from the description, the brake disc according to the invention allows overcoming the drawbacks of the prior art.

The brake disc 1 according to the invention combines lightness (thanks to the use of aluminium or aluminium alloy), wear resistance (thanks to the use of the mixture of components described) and durability.

In particular, disc 1 is provided with a protective coating (which covers at least the braking band) having:
 a high bonding strength, which ensures a high degree of anchorage on the disc;
 a high resistance to wear;
 a limited surface roughness level;
 a high density;
 a high hardness; and
 a limited porosity.

The absence of nickel greatly reduces the risk of detachment of the coating from the aluminium base or aluminium alloy.

The brake disc 1 is also cost-effective to manufacture.

The object of the present invention is also a disc brake, comprising:

a brake disc 1, in turn comprising a braking band 2 provided with two opposite braking surfaces 2a, 2b, each of which defines at least partially one of the two main sides of the disc; and friction elements, suitable for being commanded to cooperate with the braking surfaces 2a, 2b determining a braking action by friction.

The brake disc 1 is made according to what is described above.

As will be resumed in the following description, the resistance features of the coating of disc 1 made as described above (and therefore, in particular, of wear resistance of disc 1), are synergically enhanced by the combined use with the friction elements object of the present invention, which will be described in detail below.

According to the invention, each of the friction elements (which in particular are in the form of pads) comprises a friction portion composed of:

10% to 40% by weight of abrasive materials;
8% to 40% by weight of lubricants;
5% to 30% by weight of metal fibres;
6% to 18% by weight of organic binder;
10% to 20% by weight of inorganic fillers;
the balance weight percentage being organic fillers.

Preferably, the friction portion is composed of 25% to 30% by weight of abrasive materials, 25% to 35% by weight of lubricants, 15 to 20% by weight of metal fibres, 8% to 15% by weight of an organic binding agent and 10% to 20% by weight of inorganic fillers, the balance being composed of organic fillers.

According to a particularly preferred embodiment, the abrasive materials are in the form of particles having a particle size not exceeding 60 µm. The choice to use abrasive particles with the above particle size has been found to be particularly important to achieve a balance between tribological performance and wear of disc 1.

Preferably, the abrasive materials comprise particles of alumina and/or periclase.

According to a particularly preferred embodiment, alumina and periclase are both present in the friction portion. In particular, periclase has a particle size larger than alumina, for example a particle size of about 40 µm for periclase and about 30 µm for alumina.

According to a particularly preferred embodiment, the lubricants are in the form of particles having a particle size between 350 µm and 750 µm.

Preferably, the lubricants comprise graphite and/or coke.

According to a particularly preferred embodiment, graphite and coke are both present in the friction portion. In particular, graphite has a particle size larger than coke, for example a particle size of about 600 µm for graphite and about 400 µm for coke.

Preferably, the metal fibres comprise copper and/or iron fibres. In a particularly preferred manner, the friction portion comprises both copper and iron fibres.

Preferably, the percentage by weight of copper fibres is not more than 5% by weight. In this particular case, the percentage by weight of iron fibres is more than 5%.

Sponge iron—in combination with or as an alternative to the iron fibres—may also be provided in the friction portion.

Preferably, the organic binder is a phenolic resin.

Preferably, the inorganic fillers comprise barite and/or vermiculite. In a particularly preferred manner, the friction portion comprises both barite and vermiculite. In particular, the barite is present with a percentage by weight approximately twice that of vermiculite. For example, barite is present at about 10% by weight, while vermiculite at about 5% by weight.

Preferably, the organic fillers comprise rubber and/or aramid fibre. In a particularly preferred manner, the friction portion comprises both rubber (preferably in particle form having a size of about 1 mm), and aramid fibre. In particular, the rubber is present with a percentage by weight approximately twice that of vermiculite. For example, the rubber is present at about 4% by weight, while the aramid fibre at about 1% by weight.

Preferably, the friction portion of a friction element is made according to the following process:

a) obtaining a mixture as homogeneous as possible of the components: abrasive materials; lubricants; metal fibres; organic binder; inorganic fillers; and organic fillers;

b) pressing the mixture into a hot mould to obtain a preformed friction portion. After three initial cycles of degassing, the pressure must be applied in a continuous manner in order to complete the polymerization of the organic resin.

c) subjecting the friction portion to a post-curing treatment in a static furnace at a temperature between 200° C. and 280° C. and any other surface heat treatments designed to improve the tribological properties of the friction material to be subjected to surface finish the friction portion.

In the particular case in which the friction element is in the form of pad, the friction portion may be associated with a support plate (which in particular is made of metal or plastic material) already at the moulding (pressing) step b) or it may be associated to the support plate after the moulding (pressing) step b) by gluing or mechanical connection.

In particular, the moulding step b) is carried out at 150° C. and at a predetermined pressure.

According to a particularly preferred embodiment, the moulding step b) is conducted at pressures not less than 250 kg/cm2, and preferably not less than 550 Kg/cm2.

In particular, the moulding step b) is carried out at temperatures between 130° C. and 170° C.

Advantageously, the moulding step b) is conducted for a period of time not less than 5 minutes to allow the polymerization of the organic binder.

The friction portion has a density of between 2 and 3 g/cm3. Preferably, the friction portion of each friction element has a density of between 2.20 and 2.60 g/cm3.

The friction portion has a porosity not higher than 10%.

The friction material according to the invention is characterised by a lower density and a lower porosity compared to standard friction materials. Generally, in fact, conventional friction materials have a density of between 2.5 and 3.5 Kg/cm3 and a porosity of between 10% and 25%.

The lower density is linked in particular to the fact that the friction material according to the invention has a lower weight content of components at high density, in particular metals and barite, compared to traditional materials.

The low porosity is probably due to the high moulding pressure in the moulding step provided in the present invention, higher than the production standards, which usually provide, instead, values between 100 and 200 Kg/cm2.

Advantageously, the friction portion of each friction element has a rupture modulus greater than 20 MPa.

Advantageously, the friction portion of each friction element has an elastic modulus greater than 8 GPa.

The friction material according to the invention therefore has high mechanical features, which are on the maximum values or higher than what found on the market.

The rupture modulus is slightly higher than the average of the traditional friction materials (values between 15 and 20 MPa), while the elastic modulus is significantly higher. In other words, this indicates that the friction material according to the invention is a more rigid material. In fact, for the elastic modulus, traditional materials have values ranging between 4 and 8 GPa.

Generally, the metal fibres are used in friction materials to increase the mechanical features. The friction material according to the invention has superior mechanical features (rupture modulus and elastic modulus), although with a lower content by weight of metal fibres. This may be attributed to the lower porosity of the material according to the invention.

The disc brake according to the present invention characterised by the combination of the brake disc 1 and the friction elements described above showed a good tribological coupling, with average performance and very limited wear.

Below are the results of experimental tests carried out.
The following systems were bench tested:
- aluminium brake disc 1 with a protective coating according to the invention and brake pads with friction portion made with the material according to the invention (hereinafter system A);
- aluminium brake disc 1 with a protective coating according to the invention and traditional brake pads (hereinafter system B);
- aluminium brake disc 1 without a coating and brake pads with friction portion made with the material according to the invention (hereinafter system C).

In particular, the protective coating was made according to the preferred embodiment described above. Also the friction material was made according to the preferred embodiment described above.

The material supplied as a standard on vehicle with cast iron disc was used as reference friction material. Such a material is characterised by porosity and mechanical properties within the typical ranges mentioned above.

Two types of tests were carried out: run in tests and master AK tests on dynamic bench.

The run in was conducted with the following procedure:
100 braking actions; initial speed 60 km/h and ending speed 10 km/h; initial temperature of the disc=60° C.; deceleration 0.3 g; forward direction of rotation. The run in test was aimed at verifying the efficiency with new disc-pads in terms of friction coefficient. The wear and tear of disc and pads were then checked. Finally, a check of the visual appearance of the disc was carried out.

Figure 3:
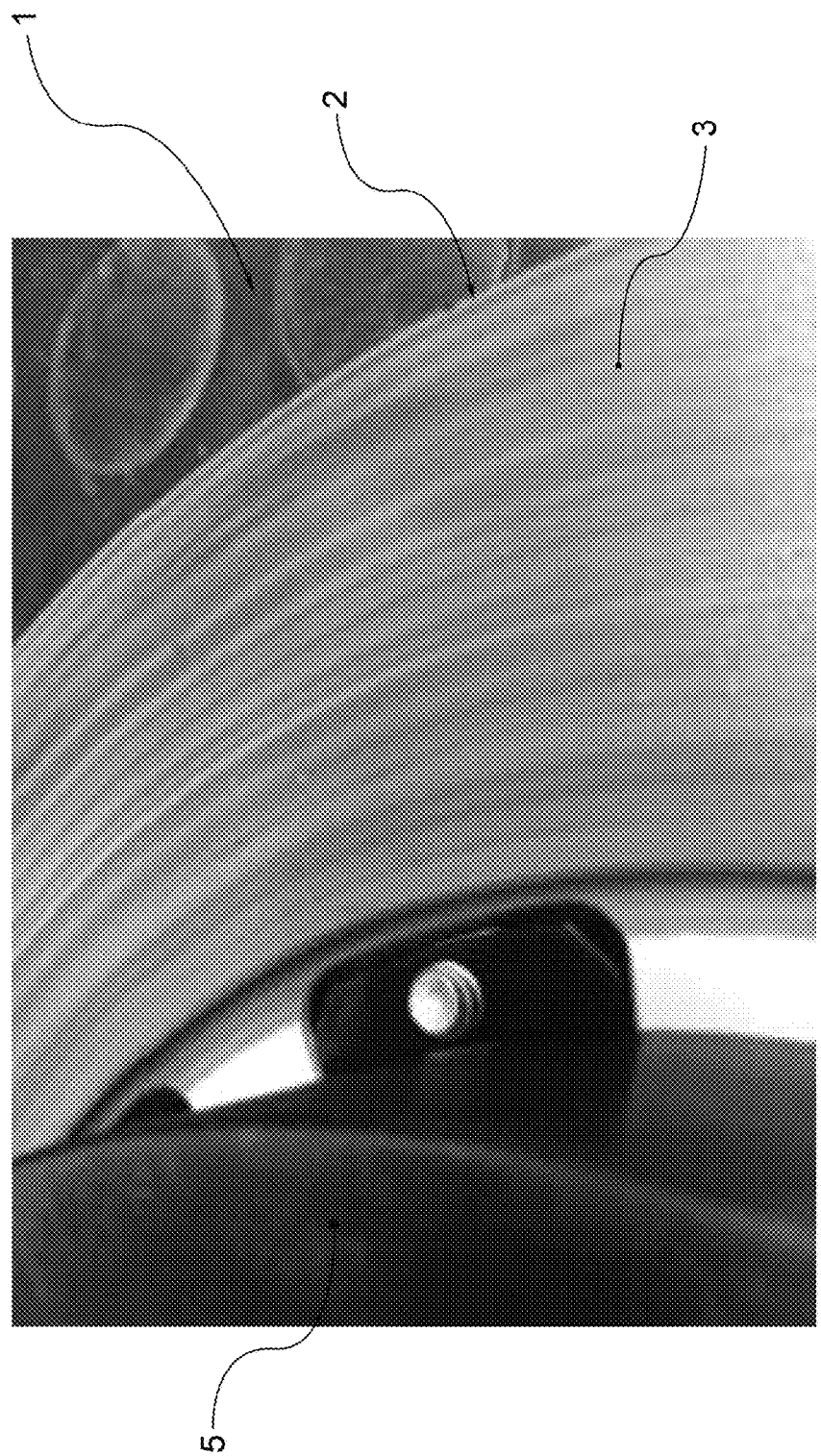
FIGS. 3, 4 and 5 show the photographs of the braking band at the end of a run in test of the disc of a disc brake, according to the invention and according to two different alternative solutions, respectively.
Figure 4:
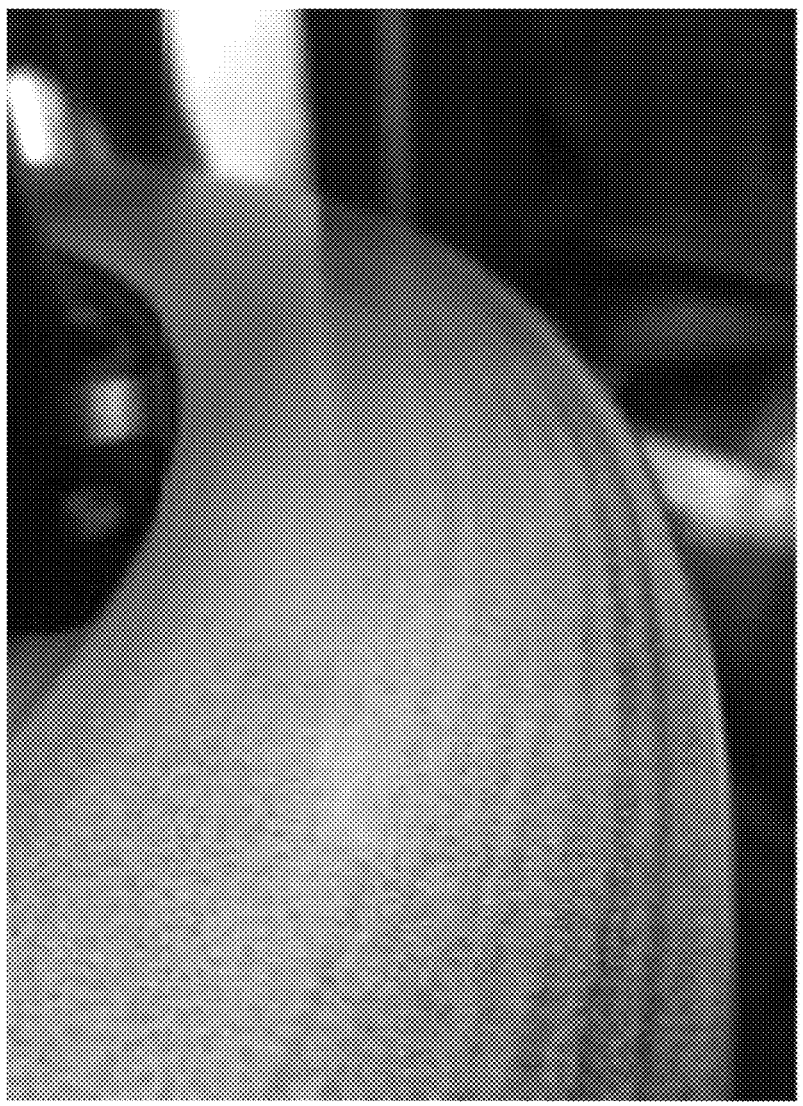
Figure 5:
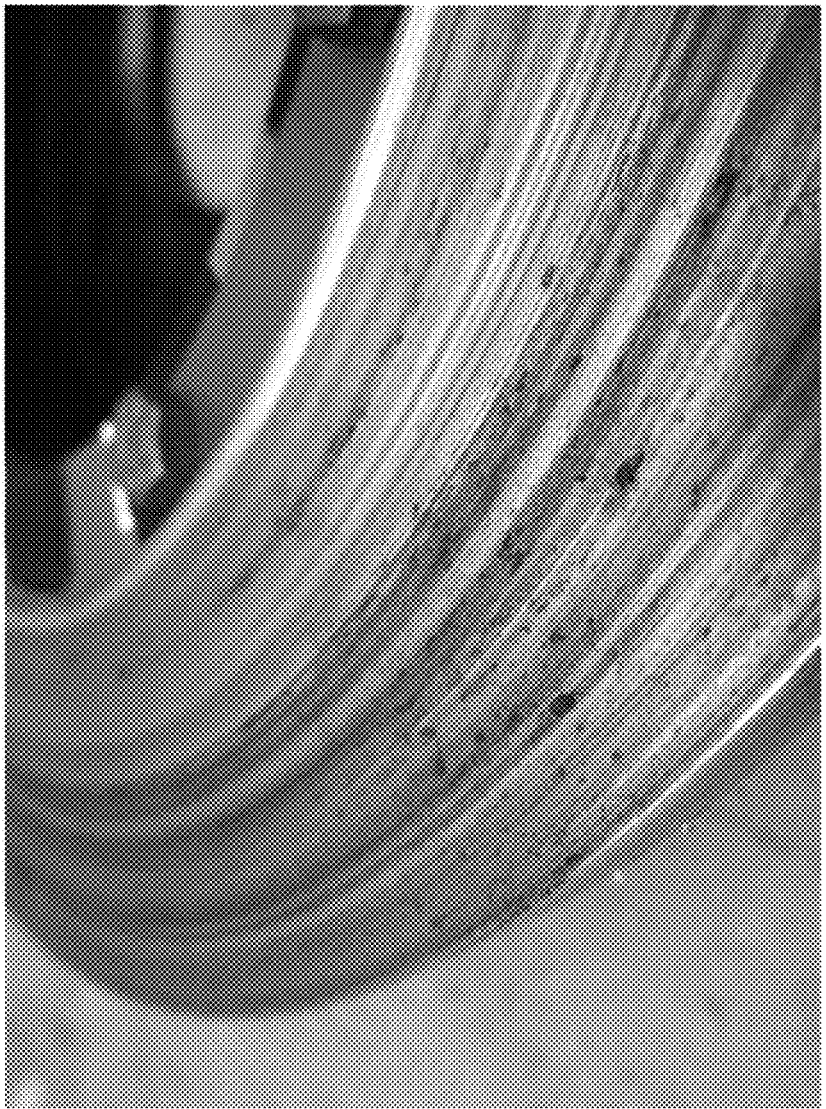

Table 1 shows the results at the end of the run in test. FIGS. 3, 4 and 5 show photographs relating to the condition of the braking bands after the run in test of system A, B and C, respectively. It should be noted that at the end of the run in test, system C showed poor condition of the disc and full wear of the pads.

TABLE 1

| RUN IN TEST | Final μ | Disc wear (g) | Disc appearance | Pad wear | Result |
|---|---|---|---|---|---|
| System A (invention) | 0.25 | 0 | Good (FIG. 3) | 1 | positive |
| System B | 0.42 | 0 | Good (FIG. 4) | 1 | positive |
| System C | 0.40 | 101 | Braking pads heavily streaked (FIG. 5) | 60 Completely worn out | negative |

The master AK tests at the dynamic bench were conducted according to the SAE-J2522 method with modifications for limiting the maximum temperature.

The master Ak test was designed to test the performance of the system in different conditions (temperatures and energy loads). The wear and tear of disc and pads were then checked. Finally, a check of the visual appearance of the disc was carried out.

Figure 6:
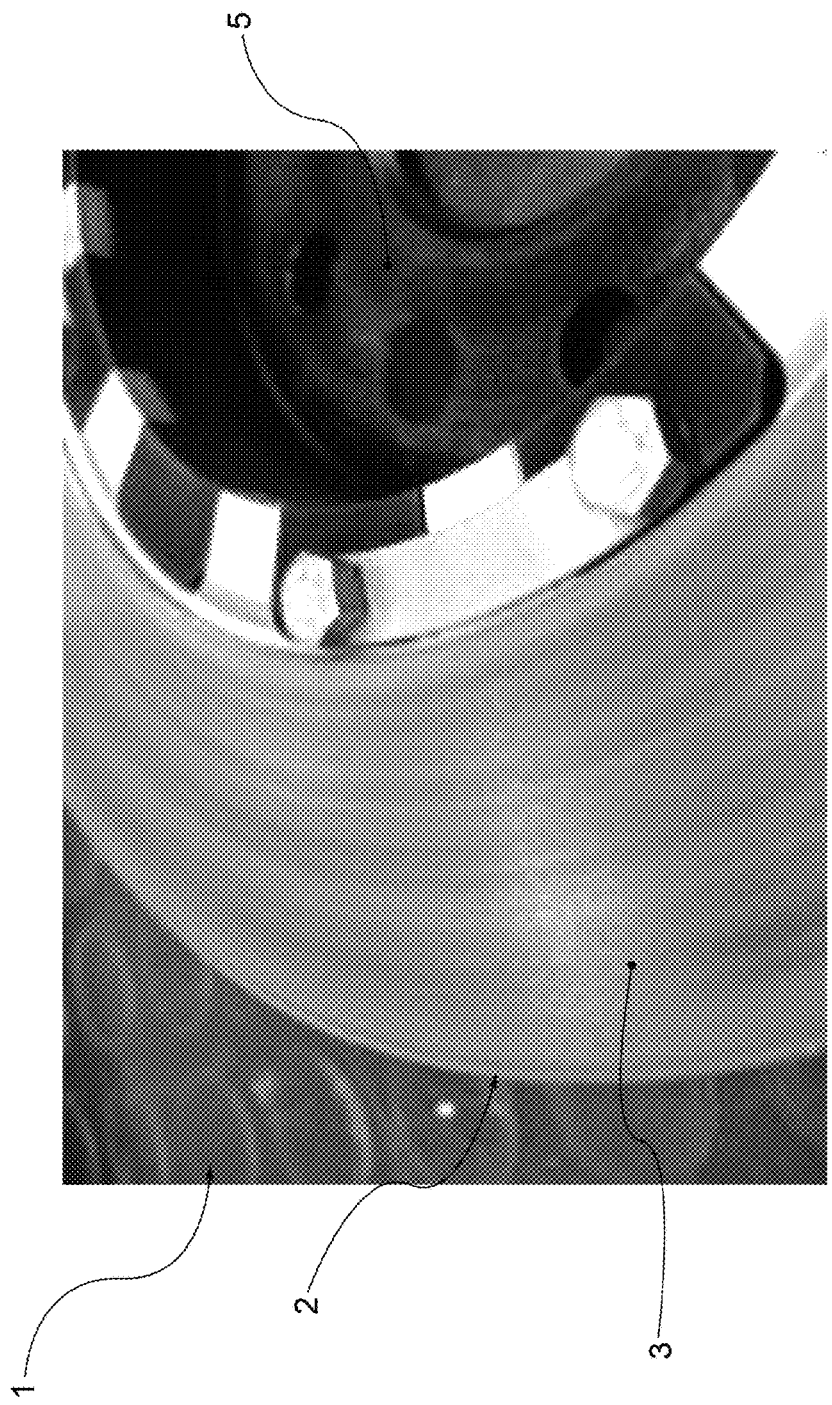
FIGS. 6 and 7 show the photographs of the braking band at the end of a master AK test on dynamic bench of the disc of a disc brake, according to the invention and according to an alternative solution, respectively.
Figure 7:

Table 2 shows the results at the end of the master AK test. System C was not tested due to the poor condition of the disc and the full wear of the pads after the run in test. FIGS. 6 and 7 show photographs relating to the condition of the braking bands after the run in test of system A and B, respectively. It should be noted that at the end of the master AK test, system B showed cracks in the coating at the end of the test.

TABLE 2

| MASTER AK TEST | average μ | Disc wear (g) | Disc appearance | Pad wear | Result |
|---|---|---|---|---|---|
| System A (invention) | 0.28 | 1 | Good (FIG. 6) | 0 | positive |
| System B | 0.34 | 0 | Cracks in coating (FIG. 7) | 2 | negative |
| System C | System C was not tested due to the poor condition of the disc and the full wear of the pads after the run in test. | | | | |

The tests showed that the brake disc according to the invention (system A) shows a good tribological coupling between disc and pads, with average performance (the average value of μ is satisfactory) and very limited wear. In particular, compared to system B, system A according to the invention has a slightly higher level of wear of the disc, but a much lower level of wear of the pads.

In particular, it is noted that the coupling between disc 1 and pads according to the invention (system A) is the one that offers better performance in terms of wear resistance.

In fact, in the case of system C, i.e. in the case of coupling of pads according to the invention with a non-coated aluminium disc, it is noted that the pads according to the invention exhibit a poor behaviour, already after the run in test. In fact, the pads were found to be completely worn out.

In the case of system B, i.e. in the case of coupling of conventional pads with an aluminium disc 1 according to the invention with protective coating, it is noted that at the end of the master AK tests, while disc 1 is not worn, however has cracks in the coating which expose it in a short time to a detachment of the same and then to a rapid deterioration of the performance.

Only in the case of system A (coupling between disc 1 and pads, both according to the invention) there is a good compromise between disc wear (reduced) and pad wear (absent) and preservation of the coating integrity.

As can be understood from the description, the brake disc according to the invention allows overcoming the drawbacks of the prior art.

The disc brake according to the present invention characterised by the combination of the brake disc 1 and the friction elements described above showed a good tribological coupling, with average performance and very limited wear.

In particular, the coupling according to the invention enhances the performance of the individual components subject to wear (i.e. disc and pads).

In particular, the brake disc 1 according to the invention combines lightness (if it is made of aluminium or aluminium alloy), wear resistance and durability, when used in combination with the brake pads according to the invention.

In particular, disc 1 is provided with a protective coating (which covers at least the braking band) having:

a high adhesion strength, which ensures a high degree of anchorage on the disc;

a high resistance to wear;

ability to work at high temperatures (it was tested up to 500° C.);

a limited surface roughness level;

a high density;

a high hardness; and a limited porosity.

The absence of nickel greatly reduces the risk of detachment of the coating, if the made is made of aluminium or aluminium alloy.

Moreover, the brake disc 1 is cost-effective to manufacture.

The friction material according to the invention has physical properties (density and porosity) superior to those of conventional materials.

The friction material according to the invention also has mechanical properties (rupture modulus and elastic modulus) higher than those of conventional materials, while having a lower content in weight of metal fibres and barite.

A man skilled in the art may make several changes and adjustments to the disc and to the disc brake described above in order to meet specific and incidental needs, all falling within the scope of protection defined in the following claims.

The invention claimed is:

1. A disc brake comprising:
a brake disc, comprising a braking band provided with two opposite braking surfaces, each of which defines at least partially one of the two main sides of the disc;
friction elements, suitable for being commanded to cooperate with said braking surfaces determining a braking action by friction,
wherein the disc is provided with a protective coating which covers at least one of the two braking surfaces of the braking band, the coating being composed of 80 to 90% by weight of tungsten carbide, 8% to 12% by weight of cobalt and 2% to 6% by weight of chromium, said coating being obtained by depositing on the disc the components of the coating in particle form using plasma spray HVOF (High Velocity Oxygen Fuel) technique, or HVAF (High Velocity Air Fuel) technique or KM (Kinetic Metallization) technique and in that each friction element comprises a friction portion composed of 25% to 30% by weight of abrasive materials, 25% to 35% by weight of lubricants, 15% to 20% by weight of metal fibres, 8% to 15% by weight of an organic binding agent and 10% to 20% by weight of inorganic fillers, the balance being composed of organic fillers, said friction portion having a density of 2 to 3 g/cm3 and porosity of not more than 10%.

* * * * *